United States Patent [19]

Nakagawa et al.

[11] 4,018,735
[45] Apr. 19, 1977

[54] ANISOTROPIC DOPES OF AROMATIC POLYAMIDES

[75] Inventors: Yasuo Nakagawa, Kokubunji; Takashi Noma; Hiroshi Mera, both of Hino, all of Japan

[73] Assignee: Teijin Limited, Osaka, Japan

[22] Filed: July 8, 1975

[21] Appl. No.: 594,130

[30] Foreign Application Priority Data

July 10, 1974 Japan .............................. 49-78163

[52] U.S. Cl. .................. 260/29.1 R; 260/30.2; 260/30.8 R; 260/32.4; 260/32.6 NT; 260/78 R; 260/78 A

[51] Int. Cl.² .................... C08K 3/16; C08K 5/20; C08K 5/21; C08K 5/36

[58] Field of Search ............. 260/78 R, 78 A, 32.4, 260/29.1 R, 30.8 R, 32.6 NT, 30.2

[56] References Cited

UNITED STATES PATENTS 3,832,320  8/1974  Aponyi et al. .................... 260/78 A

OTHER PUBLICATIONS

Hara et al., Chem. Ab., 72, (1972), p. 154742z.
Teijin Ltd., Chem. Abs., 72, (1970), p. 112082w.
Hara, Chem. Abs., 76, (1972), p. 15190e.
Teijin Ltd., Chem. Ab., 80, (1974), p. 109068f.
Iwakura, Chem. Abs., 61, (1964), p. 13434f.
Rabilloud et al., Chem. Abs., 64, (1966), p. 19810c.
Horikawa et al., Chem. Abs., 68, (1968), p. 59964z.
Rabilloud et al., Chem. Abs., 69, (1968), p. 87773a.

*Primary Examiner*—Harry Wong, Jr.
*Attorney, Agent, or Firm*—Sherman & Shalloway

[57] ABSTRACT

An anisotropic aromatic polyamide dope comprising more than 10% by weight of an aromatic polyamide and a solvent for the polyamide, said polyamide consisting essentially of, at least 5 mole% but less than 35 moles%, based on its entire units, of an only partially p-oriented structural unit expressed by the following formula

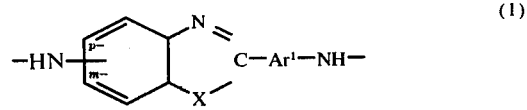

(1)

wherein $Ar^1$ is a divalent aromatic ring whose chain-extending bonds are coaxial or parallel, X is a member selected from the group consisting of O, S and NH, and the NH group bonded to the benzene ring of the above benzoxazole, benzothiazole or benzimidazole ring is meta or para to the carbon atom of said benzene ring.

13 Claims, No Drawings

ANISOTROPIC DOPES OF AROMATIC POLYAMIDES

This invention relates to an anisotropic, aromatic polyamide dope comprising more than 10% by weight of an aromatic polyamide and a solvent for the polyamide, said polyamide containing at least 5 mole% but less than 35 mole%, based on its entire units, of a not substantially wholly p-oriented structural unit expressed by the following formula

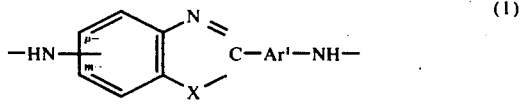

(1)

wherein $Ar^1$ is a divalent aromatic ring whose chain-extending bonds are coaxial or parallel, X is a member selected from the group consisting of O, S and NH, and the NH group bonded to the benzene ring of the above benzoxazole, benzothiazole or benzimidazole ring is meta or para to the carbon atom of said benzene ring.

More specifically, the invention relates to an aromatic polyamide dope, especially an anisotropic aromatic polyamide dope, which is suitable for use in fiber-forming and film-forming and other molding applications. It provides shaped articles such as fibers or films easily at low extruding pressures, can maintain superior stability at low temperatures without involving inconveniences such as the decomposition of the aromatic polyamide, can further provide as-spun filaments having superior superior properties, and also can impart superior fatigue resistance and knot strength in addition to such properties as superior heat resistance, high tenacity and high Young's modulus as a result of post-heat-treatment of the as-spun filaments.

It is well known that an optically anisotropic dope comprising a substantially wholly para-oriented wholly aromatic polyamide in which the chain extending bonds of the divalent aromatic ring are coaxial or parallel, for example, poly(p-phenylene terephthalamide) or poly(p-benzamide) and a solvent therefor, for example, a protonic acid such as conc. sulfuric acid, fuming sulfuric acid, hydrofluoric acid, chlorosulfonic acid, bromosulfonic acid or methanesulfonic acid, and a polar organic solvent such as an amide-type solvent (e.g., N-methylpyrrolidone or hexamethylphosphoramide) or urea-type solvent (e.g., tetramethylurea) containing a salt such as lithium chloride can be used for the manufacture of fibers having a high Young's modulus (see, for example, U.s. Pats. Nos. 3,671,542 and 3,673,143). It has already been known that such a substantially wholly para-oriented wholly aromatic polyamide dope exhibits optical anisotropy within a certain range of the concentration of the polyamide. Within this range, the viscosity of the solution advantageously decreases to a marked extent as compared with the viscosity of the solution within the range of the concentration of the polyamide which is lower than the above range but suitable for spinning and which provides optical isotropy. When the concentration of the aromatic polyamide is increased in such a dope, the viscosity of the dope becomes exceedingly high within an isotropic range before the concentrations reaches an optically anisotropic range, thus making it difficult to spin the dope. The flowability of the dope in the anisotropic dope-forming concentration range of this aromatic polyamide varies mainly according to the structure of the aromatic polyamide, the type of the solvent, and the temperature of the dope.

It is impossible, however, to decrease the concentrations of the polyamide in such an anisotropic dope in an attempt to improve the low temperature flowability and spinnability, because as stated above, this results in an unacceptable increase in dope viscosity. Furthermore, decreasing the dope viscosity is unacceptable because it will result in the reduction of the concentration of the aromatic polyamide to such a degree as to make it unsuitable for spinning. On the other hand if the temperature of the dope of a substantially wholly para-oriented aromatic polyamide is elevated in an attempt to avoid such inconveniences and improve the flowability and spinnability of the dope, the amide bond in the aromatic polyamide chain becomes susceptible to breaking so that the reduction in the degree of polymerization is accelerated. This may cause deterioration of the properties of the resulting shaped articles. For example, the use of high temperature for prolonged periods of time in the presence of strongly protonic acids used for dope preparation is likely to cause an noticeable decomposition of the polymer. When an amide-type or urea-type organic solvent containing salts is used for dope preparation, the rate of dissolving of the polymer is too slow, and long periods of time are required until the polymer reaches a dissolution equilibrium. During this time, troubles such as moisture absorption occur frequently, and the dissolving power of the solvent is often not sufficient. The elevation of the temperature might increase the rate of dissolution at this time, but this at the same time promotes the crystallization of the polymer and the flowability and stability of the dope become poor.

As a result of making investigations in order to solve the problems encountered with anisotropic dopes of substantially wholly para-oriented aromatic polyamide, we found that an aromatic polyamide consisting essentially of: at least 5 mole% but below 35 mole%, based on its entire units, of a structural unit of formla (1); 0 to 45 mole% of a structural unit of the following formula

(2)

wherein $Ar^2$ is the same in definition as $Ar^1$ and identical or different with or from $Ar^1$;

an equimolar amount, relative to the total moles of the units of formulae (1) and (2), of a structural unit of the following formula

(3)

wherein $Ar^3$ represents

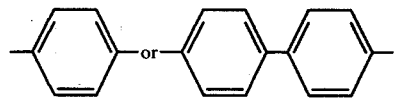

in which the benzene ring may contain a substituent selected from the group consisting of halogen atoms, lower alkyl groups, lower alkoxy groups, nitro groups and cyano groups;

and 0 to 90 mole%, based on the entire units of the polyamide, of a structural unit of the following formula

 (4)

wherein $Ar^4$ is the same in definition as $Ar^1$ and identical or different with or from $Ar^1$;
dissolves in the acid solvents or organic solvents exemplified above in a concentration of as high as more than 10% by weight and can afford optically anisotropic high concentration dopes having superior flowability, stability, and processability at low temperatures which do not cause inconveniences such as the decomposition of the aromatic polyamide.

Previous knowledge indicates that optical anisotropy is observed only with a solution of a polymer having a combination of an amide bond

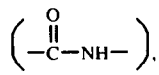

and a skeletal element oriented coaxially or in parallel with the amide bond. It was unexpected that the polyamides used in the present invention, which contain a five-membered heterocyclic ring derived from the unit (1) and are only partially para-oriented, form anisotropic dopes in such concentrations. It has also been found that as-spun filaments having superior properties can be prepared from the anisotropic dopes obtained, and by the post-heat treatment of the as-spun filaments, superior fatigue resistance and knot tenacity can be imparted in addition to superior thermal stability, high tenacity and high Young's modulus. These high concentration dopes also exhibit similar superior properties in film formation because they have such good properties at low temperatures.

For post-treating as-spun filaments of a polyamide which may contain a structural unit of formula (1), Japanese Laid-Open Patent Publication No. 2922/74 published Jan. 11, 1974 discloses a method which comprises preliminary orienting of the as-spun filaments to remove the solvent and metallic ions completely, and then post-heat treating the filaments locally. This Publication states that a solution of the polyamide in an amide solvent or conc. sulfuric acid in a low concentration should be used, and it is clearly described that the concentration of the polymer in such a solution is at least 2% by weight and should not exceed 10% by weight. The Examples of this publication show a polyamide derived from naphthalene-2,6-dicarboxylic acid dichloride and 4,4'-diamino-2-phenylbenzoxazole and a polyamide derived from naphthalene-2,5-dicarboxylic acid dichloride and 4,4'-diaminodiphenylbenzimidazole. The former is used as a dimethyl acetamide dope with a polymer concentration of 6% and the latter is used as a dimethyl acetamide dope with a polymer concentration of 2%. This publication teaches that the polymer concentration should not exceed 10% by weight, and neither describes nor suggests the preparation of anistropic dopes with a polymer concentration of more than 10% by weight and improvements brought about by an anisotropic dope of such high concentrations. Contrary to such description and intention of the prior art, it has now been found that in accordance with this invention, there is provided a dope of superior properties in which the only partially para-oriented polyamide specified in the present invention is dissolved in a concentration of more than 10% by weight.

Accordingly, it is an object of this invention to provide an anisotropic dope of an aromatic polyamide which consists essentially of the structural units (1) to (4) in the proportions specified above and which is not substantially wholly para-oriented.

The above and other objects of this invention along with its advantages will become more apparent from the following description.

The aromatic polyamides used in accordance with this invention have an inherent viscosity ($\eta_{inh}$), as measured on a solution of 0.5 g. of the polyamide in 100 ml. of 98% conc. sulfuric acid at 30° C., of at least 1.0, preferably at least 3.0.

$Ar^1$, $Ar^2$, and $Ar^4$ in the above formulae (1) (2) and (4) represent a divalent aromatic ring whose chain-extending bonds are coaxial or parallel, and which may contain the same substituents as in formula (3). Examples of these groups are 1,4-phenylene, 4,4'-biphenylene, 2,6-naphthylene, 1,5-naphthylene, and 2,5-pyridylene. Specific examples of the substituents are lower alkyl groups such as a methyl or ethyl, lower alkoxy groups such as a methoxy or ethoxy, halogen atoms such as chlorine or bromine, a nitro group, and a cyano group.

In the aromatic polyamides used in accordance with this invention, the proportions of the unit of formula (1), and the unit of formula (2) are at least 5 mole% but less than 35 mole%, and 0 to 45 mole%, respectively, based on the entire units of the polyamides. The proportion of the unit of formula (3) is substantially equimolar to the total moles of the units of formulae (1) and (2). The unit of formula (4) may, or may not, be present. The proportion of the unit of formula (4) is not more than 90 mole%, preferably not more than 50 mole%, based on the entire units of the polyamide.

The unit of formula (1) is required to be present in an amount of at least 5 mole%. If the amount of this unit is too small, the flowability and stability of the dope become poor, and this adversely affects the properties of filaments or films prepared from the dope. The flowability and stability of the dope are also degraded when the amount of this unit is too large.

A double refraction phenonmenon is observed in the optically anisotropic dopes of this invention just as in other known anisotropic dopes when they are examined under a polarizing microscope. On examination of the relation between the concentration of the aromatic polyamide used in this invention in its solvent dope and the viscosity of the dope, it is found that a maximum point of solubility inherent to an anisotropic dope exists, and when the concentration is increased beyond this maximum point, the dope becomes optically anisotropic, and the viscosity of the dope decreases. The anisotropic dopes in accordance with this invention contain the polyamide in a concentration beyond this maximum point, and exhibit the above phenomenon.

The polyamide used in this invention is prepared, for example, by a method which comprises polycondensing a diamine containing a benzoxazole or benzimidazole ring with a dicarboxylic acid halide, or by a method which comprises polycondensing a diamine containing a substituent such as —OH, —SH or —HN$_2$ with a dicarboxylic halide, and heating the resulting polyamide to dehydro-cyclize it.

In these methods for preparing the polyamides, the polycondensation of diamines with dicarboxylic acid halides is preferably performed in an amide-type or urea-type solvent held at low temperatures.

The solvent used in this invention must be capable of dissolving the polyamides. Examples of the solvent are (a) organic polar solvents such as salt-containing amide-type or urea-type solvents, and (b) protonic acids such as sulfuric acid, fuming sulfuric acid, chlorosulfonic acid, bromosulfonic acid, methanesulfonic acid, and hydrofluoric acid. Specific examples of the organic solvents (a) include dimethyl acetamide, dimethyl propionamide, N-methylpyrrolidone, N-methylcaprolactam, hexamethyl phosphoramide, tetramethylurea, and mixtures of these. Examples of the salts contained in such solvents are inorganic acid salts such as lithium chloride and calcium chloride, a hydrohalic acid salt of N-methylpyrrolidone, and a hydrohalic acid salt of hexamethylphosphoramide. The acid solvents in group (b) are especially preferred in this invention. The dopes of this invention are prepared by dissolving the polyamide consisting essentially of the units (1) to (4) in such a solvent in a concentration of more than 10% by weight, preferably 11 to 30% by weight, more preferably 12 to 25% by weight.

Specific methods for preparing the polyamide dope of this invention include, for example, a method which comprises mixing a powder of the polymer isolated with the solvent, a method which comprises polymerization of the polymer in the solvent to form the intended polymer dope or a method which comprises polymerization in the solvent, and neutralizing a part or the whole of the hydrogen chloride generated with, for example, a metal hydroxide, oxide, carbonate or hydride to form a dope containing the metal salt and the polymer.

The resulting polyamide dope of this invention has superior stability, flowability and spinnability, and can be formed into fibers or films having good mechanical properties, thermal stability and fire retardency, by being extruded, for example, through a spinning orifice or a slit.

The following Examples illustrate several of the dopes of this invention and processes for their preparation.

EXAMPLE 1

1. Preparation of polymer 2.25 g (0.01 mole) of 5-amino-2-(p-aminophenyl)benzoxazole and 1.08 g (0.01 mole) of p-phenylenediamine were dissolved in 60 ml. of dry N-methylpyrrolidone and 30 ml. of dry hexamethylphosphonamide in a stream of nitrogen, and the solution was cooled to −20° C. This solution was stirred vigorously, and 4.04 g (0.02 mole) of powdery terephthaloyl chloride was added at a time to the stirred solution. The reaction mixture become clear, then gradually became highly viscous, and in about 15 minutes assumed a clear jelly-like form. 400 ml. of N-methylpyrrolidone was added to the jelly-like reaction mixture, and the mixture was stirred at room temperature for about 6 hours to form a flowable solution which was then re-precipitated from about 2 liters of water. The precipitate was filtered, washed with water and dried to afford a polymer of the following structure having an inherent viscosity of 5.85.

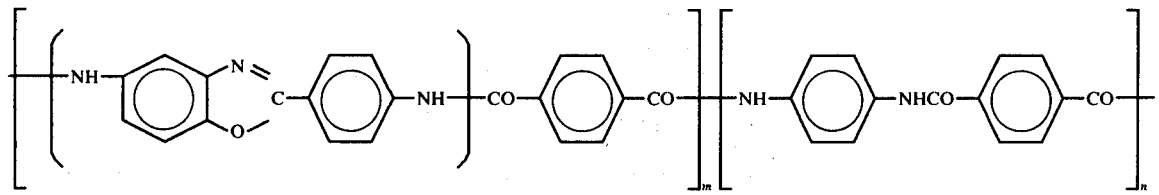

(m/n = 50/50)

2. Preparation of a dope and its properties

The aromatic polyamidebenzoxazole powder (with an inherent viscosity of 5.85) and 100% sulfuric acid were mixed with vigorous stirring at 0° C. so that the polymer concentration of the resulting dope was as indicated in Table 1 below. The viscosity of the resulting dope at 40° C. was measured by a falling-ball method, and the dope was observed under a polarizing microscope for optical anisotropy or isotropy. The results are shown in Table 1.

Table 1

| Polymer concentration (wt.%) | Viscosity (× 10⁵ poises)* | Viscosity ratio** | Observation under a polarizing microscope *** | Appearance of the dope |
|---|---|---|---|---|
| 8 (comparison) | 12.5 | 250 | Isotropic | Transparent |
| 10 (comparison) | 5.0 | 100 | " | " |
| 12 | 0.7 | 14 | Anisotropic | Semi-transparent |
| 14 | 0.2 | 4 | " | " |
| 16 | 0.05 | 1 | " | " |
| 18 | 0.04 | 0.8 | " | " |
| 20 | 0.04 | 0.8 | " | " |
| 22 | 0.09 | 1.8 | " | " |
| 25 | 0.3 | 6 | " | " |

*Measured by a falling-ball method (ball diameter 3 mm) at 40° C.
**The viscosity of a 10% by weight solution was taken as 100.
***Those which exhibited double refraction at 40° C. were classified as anisotropic dope, and those which did not, as isotropic dopes.

After storing each of these 12–25% solutions at 40° C. for 5 hours, the polymer was collected by reprecipitation, and its inherent viscosity was measured. All of the polymers collected were found to have an inherent viscosity of 5.82 to 5.87, thus showing no reduction in the degree of polymerization.

COMPARATIVE EXAMPLE 1

2.0 g of a powder of poly)p-phenylene terephthalamide) with an inherent viscosity of 5.41 was vigorously mixed with 80 g of 100% sulfuric acid at 0° C., and the mixture was heated to 40° C. The mixture was still non-uniform. When this mixture was heated to 90° C., its flowability and spinnability became superior, and it became somewhat optically anisotropic. However, the viscosity of the dope gradually decreased. After storing the dope for 5 hours at 90° C., the polymer was collected by re-precipitation. The polymer collected had an inherent viscosity of 3.58.

COMPARATIVE EXAMPLE 2

2.2 g of a powder of poly(p-phenylene terephtalamide) with an inherent viscosity of 5.41 was vigorously mixed with 78 g of 100% sulfuric acid at 0° C. and the mixture was warmed to room temperature. The mixture was still non-uniform. When this mixture was heated to 90° C., no appreciable change was seen in its appearance. When the mixture was heated to 130° C., its flowability and spinnability became good. The viscosity of the dope at 130° C. was initially 2000 poises, but gradually decreased. After being stored at 130° C. for 1 hour, the dope was re-precipitated to collect the polymer. The inherent viscosity of the polymer decreased to 2.86.

EXAMPLE 2

From 1.58 g (0.007 mole) of 5-amino-2-(p-aminophenyl) benzoxazole, 1.41 g (0.013 mole) of p-phenylenediamine and 4.04 g (0.02 mole) of terephthaloyl chloride, a polymer with an inherent viscosity of 6.12 having the following structure was prepared in the same way as in Example 1.

results are also shown in Table 2. The results shown that there was no decrease in the degree of polymerization.

Table 2

| Concentration of the polymer (wt.%) | Viscosity of the dope ($\times 10^5$ poises) | Viscosity ratio | Observation under a polarizing microscope | $(n_{inh})$ of the polymer after maintaining it at 40° C. for 6 hours |
|---|---|---|---|---|
| 8 (comparison) | 23.0 | 277 | Isotropic | |
| 10 (comparison) | 8.3 | 100 | " | |
| 12 | 0.4 | 4.8 | Anisotropic | 6.07 |
| 14 | 0.04 | 0.5 | " | 6.09 |
| 16 | 0.05 | 0.6 | " | 6.10 |
| 18 | 0.06 | 0.7 | " | 6.13 |
| 20 | 0.2 | 2.4 | " | 6.09 |
| 22 | 0.5 | 6 | " | 6.10 |
| 25 | 1.0 | 12 | " | 6.12 |

The 16 wt.% dope (40°C.) obtained above was extruded from a spinneret into the air, and wound up through a cooling water. The resulting filaments were found to have a denier size of 2.6, a tenacity of 20 g/de, an elongation of 8%, and a Young's modulus of 700 g/de. When the filaments were heat-treated under tension at 420° C., they had a denier size of 2.3 de, a tenacity of 29 g/de, an elongation of 3% and a Young's modulus of 1050 g/de, showing an improvement in properties.

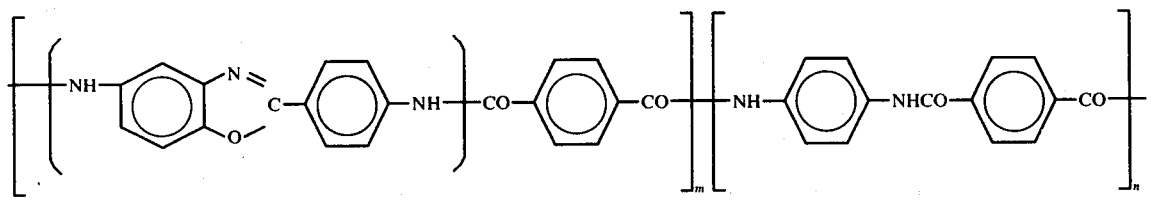

(m/n = 30/70)

The aromatic polyamide benzoxazole powder and 100% sulfuric acid were mixed vigorously at 0° C. so that the concentration of the polymer was as indicated in Table 2. The mixture was then warmed to room temperature. The viscosity of the resulting dope was measured and the dope was observed under a polarizing microscope, both at 40° C. in the same procedure as in Example 1. The results are shown in Table 2.

Each of the dopes was maintained at 40° C. for 6 hours, and re-precipitated. The inherent viscosity of each of the polymers so collected was measured. The Attempt to spin the 10 wt.% dope (40° C.) in the same way as above failed because of the high viscosity and poor spinnability of the dope. When the temperature of the dope was raised to 80° C., it could be spun. However, the resulting filaments had a denier size of 2.0 de, a tenacity of 12 g/de, an elongation of 4% and a Young's modulus of 500 g/de after heat-treatment under tension.

EXAMPLE 3

An aromatic polyamide benzoxazole with an inherent viscosity of 4.95 having the following structure was prepared in the same way as in Example 1.

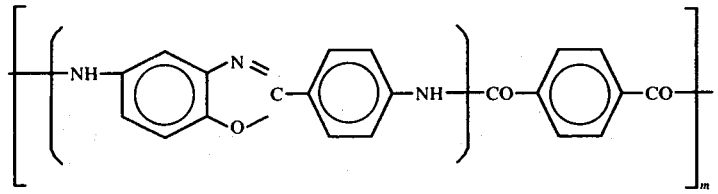

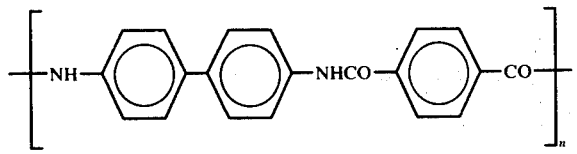

(m/n) = 50/50)

1.5 g of the resulting polymer powder was thoroughly mixed with 8.5 g of 100% sulfuric acid at 0° C., and the mixture was warmed to room temperature. The resulting dope with a polymer concentration of 15% by weight exhibited good flowability and spinnability and optical anisotropy at room temperature. The viscosity of the dope at 40° C. was 3100 poises.

EXAMPLE 4

0.673 g (0.003 mole) of 5-amino-2-(p-aminophenyl)benzimidazole and 2.901 g (0.027 mole) of p-phenylenediamine were dissolved in 26 ml. of dry N-methylpyrrolidone and 13 ml. of dry hexamethylphosphoramide in a stream of nitrogen, and the solution was cooled to −30° c. While this solution was stirred vigorously, 6.08 g (0.030 mole) of powdery terephthaloyl chloride was added to it. The reaction mixture first became transparent, then semi-transparent, and in about 1 minute, a semi-transparent mass. A part of this semi-transparent mass was observed under a polarizing microscope, and found to show a double refraction phenomenon. After stirring the mass for about 2 hours, the semi-transparent mass, partly rendered powdery, was transferred into a small-sized kneader, and 21.2 g of lithium carbonate was added. When they were mixed for about 1 hour, a semi-transparent dope was obtained. This dope was an N-methylpyrrolidone/hexamethylphosphoramide solution containing 15% by weight of an aromatic polyamidebenzimidazole having the following structure

EXAMPLE 5

0.449 (0.002 mole) of 5-amino-2-(p-aminophenyl)benzimidazole and 1.945 g (0.018 mole) of p-phenylenediamine were dissolved in 22ml. of dry N-methylpyrrolidone and 11 ml. of dry hexamethylphosphoramide in a stream of nitrogen, and the solution was cooled to −30° C. This solution was vigorously stirred, and 4.08 g (0.0201 mole) of powdery terephthaloyl chloride was added at one time to the stirred solution. The reaction mixture first became transparent and then semi-transparent. After stirring it for about 2 hours, the semi-transparent mass, partly rendered powdery, was transferred to a small-sized kneader, and 1.485 g of lithium carbonate was added. The ingredients were mixed for about 30 minutes, whereupon the mixture gradually showed flowability and finally became a semi-transparent dope.

This dope contained 12.5% by weight of an aromatic polyamidebenzimidazole ($\eta_{inh}$ =6.97) having the structure shown in Example 4. A part of the dope was observed at room temperature under a polarizing microscope, and found to show a double refraction phenomenon and therefore to be an optically anisotropic dope. To the dope were added 20 ml. of N-methylpyrrolidone and 10 ml. of hexamethylphosphoramide so as to adjust the concentration of the polymer to 7% by weight, whereupon the dope became transparent and lost flowability. Observation under a polarizing microscope showed that this 7% by weight dope was optically iso-

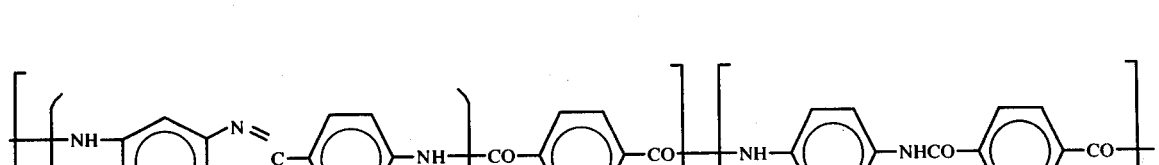

(m/n) = 10/90) ($\eta_{inh}$ 6.63)

and 5% by weight of lithium chloride. A part of this dope, was observed at room temperature under a polarizing microscope, and found to be an optically anisotropic dope.

15 ml. of hexamethylphosphoramide and 30 ml. of N-methylpyrrolidone were added to this dope to adjust the concentration of the polymer to 7.7% by weight. The dope became transparent, and lost flowability. A part of this dope was observed under a polarizing microscope, and found to be optically isotropic.

tropic.

EXAMPLES 6 TO 9 AND COMPARATIVE EXAMPLES 3 AND 4

By the same method as in Example 1, 3.36 g (0.015 mole) of 5-amino-2-(p-aminophenyl)benzimidazole, 1.62 g (0.015 mole) of p-phenylenediamine and 6.09 g (0.03 mole) of terephthaloyl chloride were polymerized to afford an aromatic polyamidebenzimidazole ($\eta_{inh}$ =6.35) of the following structure

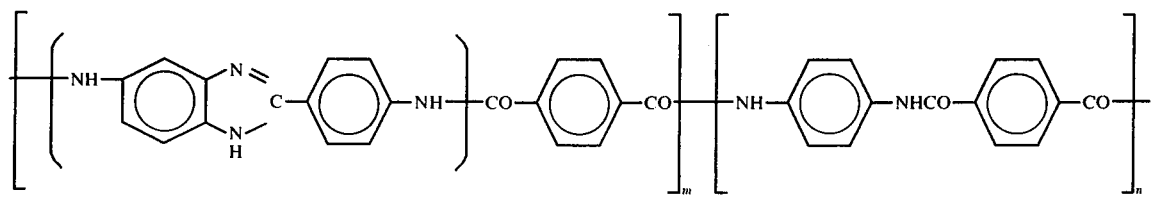

(m/n = 50/50)

This polymer was mixed with 99.8% sulfuric acid in the same way as in Example 1. The forms of the dopes at varying polymer concentrations as shown in Table 3 were observed, and the viscosities of the dopes at the varying polymer concentrations were measured. The method and conditions for the measurement were the same as those in Example 1. The results are shown in Table 3.

Each of the dopes obtained was extruded from a spinneret into the air, passed through cooling water and the wound up. The resulting filaments were washed with water, dried, and heat-treated under tension at 350° to 500° C. The properties of the as-spun filaments and of the heat-treated filaments are shown in Table 3.

EXAMPLE 11

A 16% by weight dope was prepared by the same procedure as in Example 10 from 1.60 g of the aromatic polyamide benzoxazole ($\eta_{inh}$ =6.12) prepared in Example 2 and 8.40 g of chlorosulfonic acid. This dope had a viscosity of 3000 poises at 40° C., and showed good spinnability. It was found to be optically anisotropic.

EXAMPLES 12 TO 15 AND COMPARATIVE EXAMPLE 5

Five polymers having the following structure were prepared from 5-amino-2-(p-aminophenyl)benzimidazole, p-phenylenediamide and terephthaloyl Table 3

| Runs Nos. | Polymer concentration (wt.%) | Observation under polarizing microscope at 40° C. | Dope viscosity (poises at 40° C.) | Spinning conditions | Properties of the as-spun filaments (upper row) and of the heat-treated filaments (lower row) | | | |
|---|---|---|---|---|---|---|---|---|
| | | | | | Denier size (de) | Tenacity (g/de) | Elongation (%) | Young's modulus (g/de) |
| Example 6 | 12 | Anisotropic | 4300 | Good | 2.8 | 17 | 9.1 | 680 |
| | | | | | 2.4 | 21 | 3.5 | 980 |
| Example 7 | 16 | " | 2100 | Good | 2.5 | 21 | 8.5 | 720 |
| | | | | | 2.2 | 30.5 | 2.5 | 1150 |
| Example 8 | 20 | " | 2500 | Good | 2.8 | 23 | 8.0 | 700 |
| | | | | | 2.3 | 29.5 | 3.0 | 1200 |
| Example 9 | 24 | " | 4500 | Good | 2.7 | 18 | 7.1 | 620 |
| | | | | | 2.5 | 26.3 | 2.1 | 1050 |
| Comparative Example 3 | 8 | Isotropic | above 10000 | Spinning different | 2.5 2.2 | 6.8 10.5 | 14.3 3.0 | 360 630 |
| Comparative Example 4 | 10 | " | above 10000 | Spinning impossible | — | — | — | — | chloride by the same method as in Example 1.

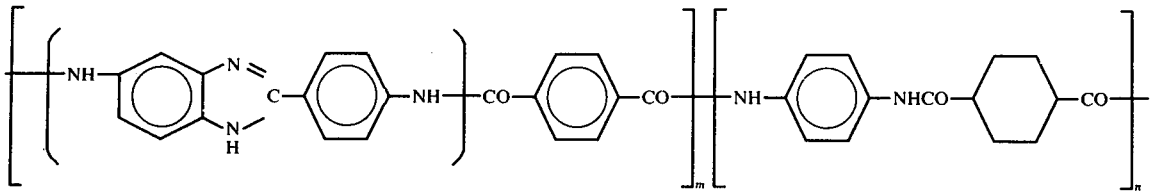

(m/n = 70/30, 40/60, 20/80, 10/90, 4/96)

EXAMPLE 10

1.40 g of the aromatic polyamidebenzimidazole ($\eta_{inh}$ =6.35) perpared in Example 6 was vigorously mixed with 8.60 g of chlorosulfonic acid at 0° C., and then the mixture was warmed to 40° C. This dope had a viscosity of 2200 poises at 40° C. and showed good spinnability. A part of this dope was observed under a polarizing microscope, and found to show a double refraction phenomenon and therefore to be optically anisotropic.

2.0 g of each of these polymers was mixed vigorously with 8.0 g of 100% sulfuric acid at 0° C. The temperature of the mixture was gradually raised to determine a point at which the mixture exhibited the properties of an optically anisotropic dope and good flowability and spinnability and at which the mixture became spinnable. The reduction in the inherent viscosity of the polymer was also measured upon maintaining the mixture at this temperature for 5 hours. The results are shown in Table 4.

when the concentration of the polymer was 11 to 25% by weight.

Table 4

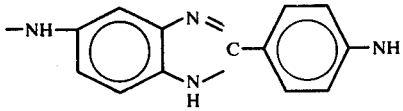

| Runs Nos. | m/n | (mole %) | $\eta_{inh}$ | Spinnable temperature (°C.) 20 wt.% | $\eta_{inh}$ after maintaining for 5 hours | Retention of $\eta_{inh}$ % |
| --- | --- | --- | --- | --- | --- | --- |
| Example 12 | 70/30 | 35 | 6.30 | 0 | 6.31 | 100 |
| Example 13 | 40/60 | 20 | 6.61 | 0 | 6.59 | 100 |
| Example 14 | 20/80 | 10 | 7.33 | 10 | 7.33 | 100 |
| Example 15 | 10/90 | 5 | 7.18 | 40 | 7.14 | 99 |
| Comparative Example 5 | 4/96 | 2 | 5.86 | 80 | 4.01 | 68 |

The dope (40°C.) obtained in Example 14 was extruded from a spinneret into the air, passed through cooling water, and wound up. The resulting filaments had a denier size of 2.7 denier, a tenacity of 6%, and a Young's modulus of 650 g/de. When the filaments were heat-treated under tension at 470° C., the filaments had a denier size of 2.5 denier, a tenacity of 30 g/de, an elongation of 2%, and a Young's modulus of 1000 g/de.

EXAMPLE 16

An aromatic polyamidebenzoxazole having the following structure was prepared from 6-amino-2-(p-aminophenyl)benzoxazole, p-phenylenediamine and terephthaloyl chloride by the same procedure as in Example 1.

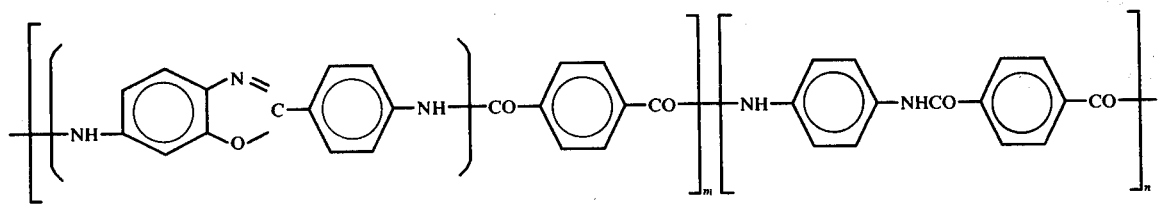

(m/n = 40/60) ($\eta_{inh}$ = 4.81)

This polymer was mixed vigorously with 99.8% sulfuric acid at room temperature, and the mixture was raised to 40° C. The dope exhibited optical anisotropy

EXAMPLE 17

An aromatic polyamidebenzothiazole having the following structure was prepared from 5-amino-2-(p-aminophenyl)benzothiazole, p-phenylenediamide and terephthaloyl chloride by the same method as in Example 1.

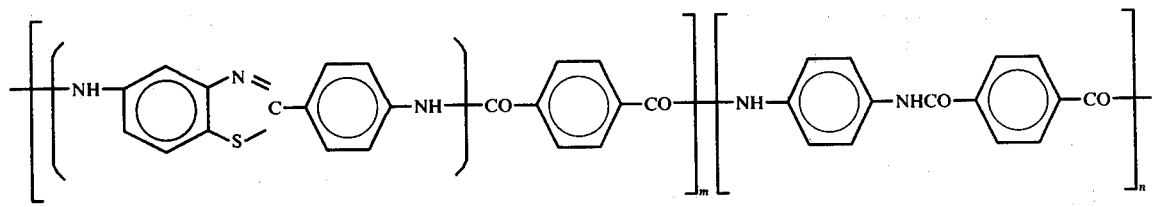

(m/n = 30/70) ($\eta_{inh}$ = 4.37)

This polymer was mixed vigorously with 99.9% sulfuric acid at 0° C. When the mixture was warmed to 40° C., the resulting dope showed optical anisotropy and good flowability and spinnability when the concentration of the polymer was 11 to 24% by weight.

EXAMPLE 18

An aromatic polyamidebenzimidazole of the following structure was prepared from 5-amino-2-(p-aminophenyl) benzimidazole, p-phenylenediamine and 4,4'-biphenyldicarboxylic acid dichloride in the same way as in Example 1.

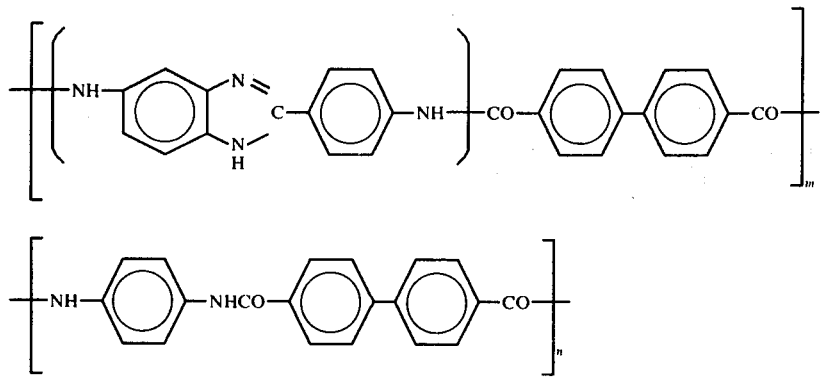

(m/n = 50/50) ($\eta_{inh}$ = 4.66)

The resulting polymer (1.5 g) was mixed vigorously with 8.5 g of 100% sulfuric acid at 0° C. When the mixture was warmed to 40° C., the dope exhibited optical anisotropy.

EXAMPLE 19

0.480 g (0.0021 mole) of 5-amino-2-(p-aminophenyl) benzimidazole and 0.926 g (0.0086 mole) of p-phenylenediamine were dissolved in 7 ml. of dry N-methylpyrrolidone and 14 ml. of dry hexamethylphosphoramide in a stream of nitrogen, and the solution was cooled to −25° C. This solution was stirred vigorously, and 2.183 g (0.0108 mole) of powdery terephthaloyl chloride was added at a time to the stirred solution. The reaction mixture once became transparent, and finally semi-transparent jelly-like. A part of the reaction mixture was observed under a polarizing microscope, and a stripped pattern colored red, green and yellow was seen. Thus, this demonstrates that the jelly-like matter had optical anisotropy.

The jelly-like matter was transferred into a small sized kneader, and lithium carbonate was added. When they were mixed for about 1 hour, a semi-transparent dope having flowability was obtained. This dope contained 12% by weight of polyamidebenzimidazole of the following structure.

Observation under a polarizing microscope showed that this dope was also optically anisotropic. 5ml. of N-methylpyrrolidone and 10 ml. of hexamethylphosphoramide were added to the dope to adjust the concentration of the polymer to 8% by weight, whereupon the dope became transparent and its flowability became very poor. This 8% by weight dope was optically isotropic.

COMPARATIVE EXAMPLE 6

An aromatic polyamidebenzimidazole having the following structure was prepared from 5-amino-2-(m-aminophenyl)benzimidazole, p-phenylenediamine and terephthaloyl chloride in the same manner as in Example 1.

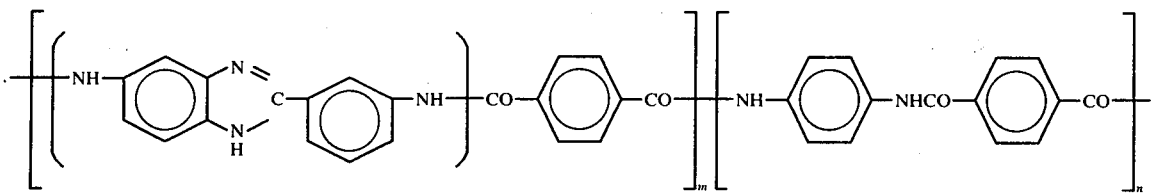

(m/n = 50/50) ($\eta_{inh}$ = 6.54)

This polymer was mixed with 99.9% sulfuric acid in varying concentrations. In all cases, only an optically isotropic dope was obtained, and the polymer concentration at which the viscosity and spinnability of the dope were satisfactory was not more than 5% by weight. The filaments obtained from such dopes had a tenacity of 10 g/de, an elongation of 7%, and a Young's modulus of 270 g/de.

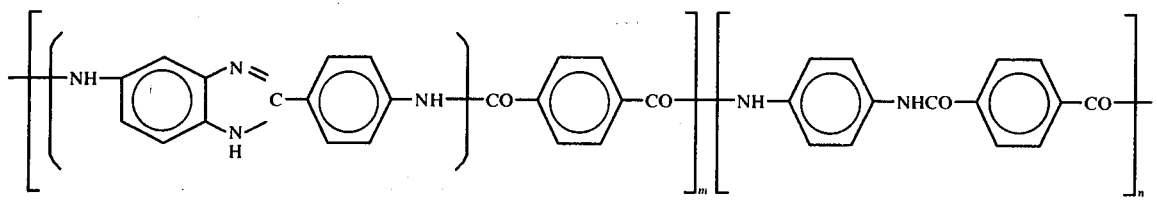

(m/n = 20/80) ($\eta_{inh}$ = 5.98)

COMPARATIVE EXAMPLE 7

An aromatic polyamidebenzimidazole having the following structure was prepared from 5-amino-2-(p-aminophenyl)benzimidazole, p-phenylenediamine and isophthaloyl chloride by the same method as in Example 1.

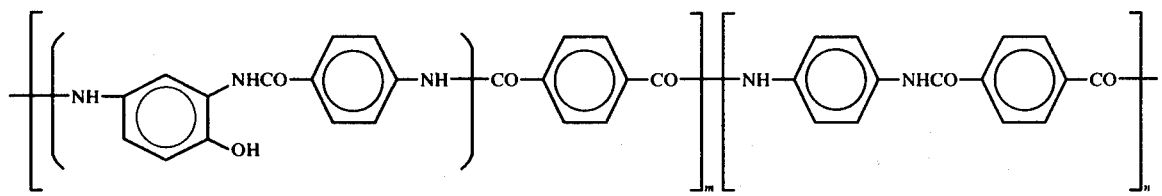

(m/n = 20/80)

This polymer was mixed with 99.9% sulfuric acid in varying concentrations. However, all of the dopes obtained were optically isotropic, and the concentration of the polymer at which the viscosity and spinnability of the dope were satisfactory was not more than 10% by weight.

EXAMPE 20

1.73 g (0.016 mole) of p-phenylenediamine and 0.97 g (0.004 mole) of 4,3'-diamino-6'-hydroxybenzanilide were dissolved in 15 ml. of dry N-methylpyrrolidone and 30 ml. of dry hexamethylphosphoramide in a stream of nitrogen, and the mixture was cooled to −15° C. This solution was vigorously stirred, and 4.06 g (0.020 mole) of powdery terephthaloyl chloride was added at a time to the stirred solution. The viscosity of the reaction mixture increased while it remained a transparent solution, and finally the mixture became jelly-like. 100 ml. of N-methylpyrrolidone was added to the jelly-like mixture, and the mixture was stirred at room temperature for about 3 hours to form a low viscosity solution, which was then re-precipitated in about 400 ml. of water. The polymer obtained after filtration, washing with water, and drying had the following structure.

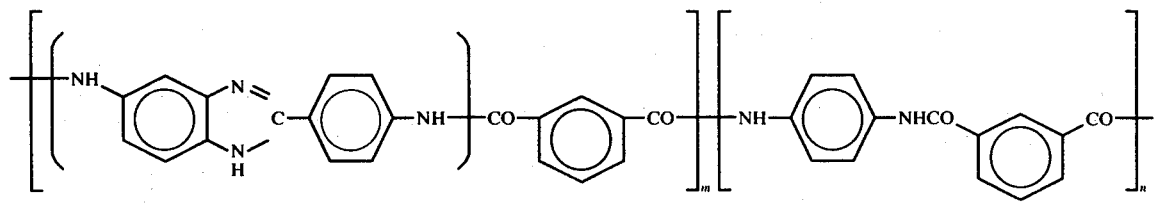

(m/n = 50/50) ($\eta_{inh}$ = 3.57)

The powdery polymer obtained was filled in a glass tube, and heated to 350° to 370° C. for about 6 hours in a stream of nitrogen. The polymer showed a weight decrease of 1.1% upon heating. From its infrared absorption spectrum, the polymer was found to have the following structure

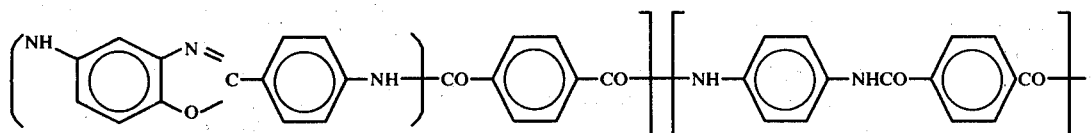

(m/n = 20/80)

The polymer had an inherent viscosity of 4.88.

1.4 g of this powdery polymer was mixed well with 8.6 g of 101% sulfuric acid at 0° C., and the mixture was warmed to 40° C. The resulting dope had a polymer concentration of 14% by weight, and exhibited superior flowability and spinnability. It was found to be optically anisotropic.

EXAMPLE 21

A polymer ($\eta_{inh}$ =3.77) having the following structure was prepared from 5-amino-2-(p-aminophenyl)-benzimidazole, p-phenylenediamine, p-aminobenzoyl chloride hydrochloride and terephthaloyl chloride in the same way as in Example 1.

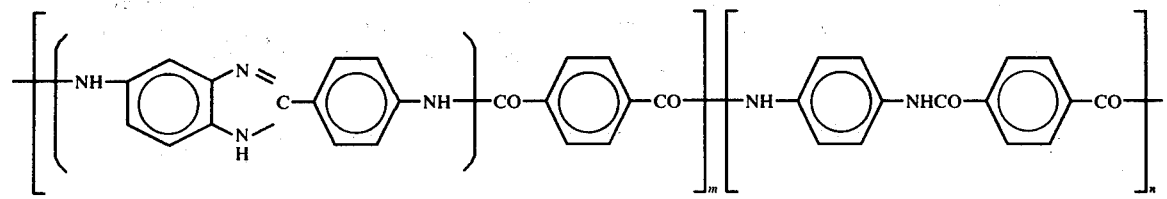

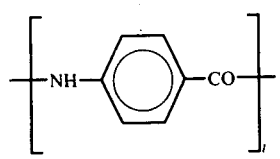

(m/n/l = 30/60/10)

1.5 g of the resulting powdery polymer was mixed well with 8.5 g of 100% sulfuric acid at 0° C., and the mixture was warmed to 40° C. The resulting dope (with a polymer concentration of 15% by weight) exhibited superior flowability and spinnability and was found to be optically anisotropic.

What we claim is:

1. An anisotropic dope of an aromatic polyamide, comprising more than 10% by weight of an aromatic polyamide and an organic polar or protonic acid solvent therefore, said aromatic polyamide consisting essentially of 100 mole% of:
   A. at least 5 mole% but less than 35 mole%, based on the entire units of the polyamide, of units of formula (1) below

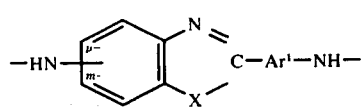 (1)

wherein Ar¹ is a divalent aromatic ring whose chain-extending bonds are coaxial or parallel and is a phenylene, biphenylene, naphthylene or pyridylene, each of which may have a substituent which is a lower alkyl, lower alkoxy, halogen, nitro, or cyano group, X is a member selected from the group consisting of O, S and NH, and the NH group bonded to the benzene ring of the above benzoxazole, benzothiazole or benzimidazole ring is meta or para to the carbon atom to which X is bonded of said benzene ring;
   B. 0 to 45 mole%, based on the entire units of the polyamide, of units of formula (2) below —NH—Ar²—NH— (2)

wherein Ar² is the same in definition as Ar¹, and is identical to or different from Ar¹;
   C. an equimolar amount, based on the total moles of the units of formulae (1) and (2) above, of a structural unit of formula (3) below — CO — Ar³ —CO — (3)

wherein Ar³ is

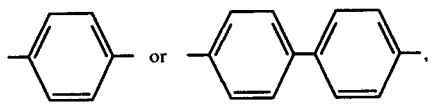

in which the benzene ring optionally contains a substituent selected from the group consisting of halogen, lower alkyl, lower alkoxy, nitro and cyano; and
   D. 0 to 90 mole%, based on the entire units of the polyamide, of a structural unit of formula (4) below — NH — Ar⁴ —CO — (4)

wherein Ar⁴ is the same in definition as Ar¹, and is identical to or different from Ar¹.

2. The anisotropic dope of claim 1 wherein the proportion of the polyamide is 11 to 30% by weight.

3. The anisotropic dope of claim 1 wherein said solvent is a protonic acid solvent and is selected from the group consisting of concentrated sulfuric acid, fuming sulfuric acid, hydrofluoric acid, chlorosulfonic acid, bromosulfonic acid anmd methanesulfonic acid.

4. The anisotropic dope of claim 1 wherein said solvent is an organic pole solvent and is selected from the group consisting of salt-containing amide-type solvents and urea-type solvents.

5. The anisotropic dope of claim 1 wherein units of formula (2) are present.

6. The anisotropic dope of claim 1 wherein units of formula (4) are present.

7. The anisotropic dope of claim 6 wherein the proportion of the structural unit of formula (4) is not more than 50 mole% based on the entire units of the polyamide.

8. The anisotropic dope of claim 5 wherein units of formula (4) are present.

9. The anisotropic dope of claim 2 wherein the proportion of the polyamide is 12 to 25% by weight.

10. The anisotropic dope of claim 1 wherein the aromatic polyamide has an intrinsic viscosity of at least 1.0, as measured on a solution of 0.5 g of the polyamide in 100 ml. of 98% conc. sulfuric acid at 30° C.

11. The anisotropic dope of claim 10 wherein the aromatic polyamide has an intrinsic viscosity of at least 3.0.

12. The anisotropic dope of claim 4 wherein the organic polar solvent is selected from at least one of the group consisting of dimethyl acetamide, dimethyl propionamide, N-methyl-pyrrolidone, N-methylcaprolactam, hexamethylphosphoramide, and tetramethylurea, and the salts contained in the amide-type solvents are inorganic acid salts.

13. The anisotropic dope of claim 1, wherein Ar¹ is: 1,4-phenylene; 4,4'-biphenylene; 2,6-naphthylene; 1,5-naphthylene; or 2,5-pyridylene; each of which may have a substituent which is a: methyl; ethyl; methoxy; ethoxy; chlorine; bromine; nitro; or cyano group.

* * * * *